United States Patent
Min

(10) Patent No.: US 9,376,053 B2
(45) Date of Patent: Jun. 28, 2016

(54) HEAD LAMP CUT OFF POSITION CORRECTION SYSTEM FOR VEHICLE AND METHOD THEREOF

(71) Applicant: Hyundai Motor Company, Seoul (KR)

(72) Inventor: Jae Woong Min, Seoul (KR)

(73) Assignee: Hyundai Motor Company, Seoul (KR)

( * ) Notice: Subject to any disclaimer, the term of this patent is extended or adjusted under 35 U.S.C. 154(b) by 103 days.

(21) Appl. No.: 14/491,502

(22) Filed: Sep. 19, 2014

(65) Prior Publication Data
US 2015/0165962 A1   Jun. 18, 2015

(30) Foreign Application Priority Data

Dec. 18, 2013  (KR) .................. 10-2013-0157980

(51) Int. Cl.
*B60Q 1/14* (2006.01)
(52) U.S. Cl.
CPC .......... *B60Q 1/143* (2013.01); *B60Q 2300/112* (2013.01); *B60Q 2300/114* (2013.01); *B60Q 2300/3321* (2013.01); *B60Q 2300/41* (2013.01); *B60Q 2300/42* (2013.01)
(58) Field of Classification Search
CPC ...... B60Q 1/085; B60Q 1/143; B60Q 1/1423; B60Q 2300/114; B60Q 2300/41; B60Q 2300/3321; B60Q 2300/42; B60Q 2300/112
See application file for complete search history.

(56) References Cited

U.S. PATENT DOCUMENTS

| 2008/0298077 A1* | 12/2008 | Naganawa | ............ B60Q 1/085 362/466 |
| 2009/0086497 A1* | 4/2009 | Kamioka | ............... B60Q 1/085 362/466 |
| 2015/0316225 A1* | 11/2015 | Yamamoto | .......... F21S 48/1159 362/282 |

FOREIGN PATENT DOCUMENTS

| JP | 06-235679 A | 8/1994 |
| JP | 2006-315667 A | 11/2006 |
| JP | 2008-265394 A | 11/2008 |

* cited by examiner

*Primary Examiner* — Bao Q Truong
(74) *Attorney, Agent, or Firm* — McDermott Will & Emery LLP

(57) ABSTRACT

A head lamp cut off position correction system for a vehicle includes a head lamp switch configured to output a turn-on/off signal of a head lamp. A vehicle speed detector is configured to detect a driving vehicle speed. A video input is configured to detect a video of a front of the vehicle while driving. A controller is configured to determine an actual cut off position of a head lamp low beam by analyzing a video image detected by the video input, compares the determined cut off position and a cut off control value of the head lamp low beam depending on a height of the vehicle, and corrects the cut off position. An actuator aligns a beam position of the head lamp upward or downward by control from the controller.

10 Claims, 4 Drawing Sheets

HEAD LAMP CUT OFF POSITION CORRECTION SYSTEM FOR VEHICLE AND METHOD THEREOF

CROSS-REFERENCE TO RELATED APPLICATION

This application claims the benefit of priority to Korean Patent Application No. 10-2013-0157980 filed in the Korean Intellectual Property Office on Dec. 18, 2013, the entire contents of which are incorporated herein by reference.

TECHNICAL FIELD

The present disclosure relates to a head lamp cut off position correction system for a vehicle and a method thereof, and more particularly, to a head lamp cut off position correction system for a vehicle and a method thereof that can provide optimal night visibility by correcting a mechanical error caused by extracting a cut off position of a head lamp low beam irradiated onto a road surface by using a video of a night camera.

BACKGROUND

In general, a head lamp is mounted on a vehicle, which emits a light to provide a front visibility when driving the vehicle at night, in a tunnel in which a surrounding environment is dark, foggy, or rainy.

A low beam irradiated for a close range and a high beam irradiated for a long range are integrally mounted in the head lamp, and the head lamp allows the low beam or the high beam to be irradiated according to user's selection. The head lamp low beam is aligned to a cut off position regulated by government restrictions for vehicles.

In Europe, the cut off position of the head lamp low beam is regulated so that an initial position, which is aligned when the vehicle is marketed, is maintained. As a result, a system that can manually or automatically control the cut off position of the head lamp low beam is mounted. Further, it will be legally regulated even in Korea to mount a system that can align the cut off position of the head lamp low beam to the initial position.

There are techniques that control the cut off position of the head lamp low beam which depends on a type of vehicle to correspond to a value assigned for each vehicle.

FIG. 4 is a diagram illustrating a head lamp aiming structure in the related art. As illustrated in FIG. 4, a pivot point 13 is fixed, and a motor 15, which aligns a cut off position of a low beam by automatically controlling a head lamp 11 in a vertical direction, and a manual controller 17, which manually controls the head lamp 11 in the vertical direction, are constituted.

Accordingly, when the motor 15 or the manual controller 17 is actuated forward/backward, the pivot point 13 is fixed, such that an aiming point 19 moves vertically, and as a result, the head lamp 11 moves vertically to align the cut off position of the low beam.

As described above, the motor that automatically controls the cut off position of the head lamp low beam and a driving unit that is mechanically controlled manually depending on a vehicle posture are separated from each other.

Accordingly, when a driving error of the motor occurs and a structure which is mechanically controlled manually is loose or misaligned, it is not possible to control the cut off position of the head lamp, and as a result, the cut off position may be controlled upward or downward to follow a rule reference range but the cut off position of the head lamp low beam is controlled excessively downward or upward, and as a result, consumer complaints may occur.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a head lamp cut off position correction system for a vehicle and a method thereof having advantages of providing optimal night visibility by correcting a mechanical error by extracting a cut off position of a head lamp low beam irradiated onto a road surface by using a video of a night camera.

According to an exemplary embodiment of the present disclosure, a head lamp cut off position correction system for a vehicle includes a head lamp switch which outputs a turn-on/off signal of a head lamp. A vehicle speed detector detects a driving vehicle speed. A video input detects a video of a front of the vehicle while driving. A controller determines an actual cut off position of a head lamp low beam by analyzing a video image detected by the video input, compares the determined cut off position and a cut off control value of the head lamp low beam depending on a height of the vehicle, and corrects the cut off position. An actuator aligns a beam position of the head lamp upward or downward by control of the controller.

The controller may synthetically determine surrounding illumination, the presence of a streetlamp, the presence of a preceding/oncoming vehicle, and an acceleration in order to determine the reliable cut off position of the head lamp low beam, and calculate the actual cut off position of the head lamp low beam from the video image only when there are no surrounding light and no other surrounding vehicles.

The controller divides a bright part and a dark part of each pixel by analyzing the video image under a cruising condition to calculate the actual cut off position of the head lamp low beam.

The controller may calculate the actual cut off position of the head lamp low beam at the set number of times or more by analyzing the video image, and thereafter, average the calculated cut off position to apply the averaged cut off position to a cut off distance.

The controller may calculate the cut off position of a control value output depending on the vehicle height by applying an irradiation angle of the head lamp low beam and a height from the ground.

According to another exemplary embodiment of the present disclosure, a head lamp cut off position correction method includes analyzing a video image by capturing a video of a road in front of a vehicle while night driving with a head lamp being turned on. It is determined whether a current driving condition satisfies a determination condition of a cut off position of the head lamp low beam. An actual cut off position of the head lamp low beam is determined by dividing a bright part and a dark part of a video image pixel when the cut off position of the head lamp low beam satisfies the determination condition. A deviation is extracted by comparing a cut off position control value of the head lamp low beam depending on a height of the vehicle and the actual cut off position of the head lamp low beam calculated by analyzing the video image. The cut off position is aligned through an actuator by calculating a cut off position correction value of the head lamp low beam in accordance with the extracted deviation.

The determination condition of the cut off position of the head lamp low beam may be determined as a case in which there is surrounding light and no other surrounding vehicle and a state in which the vehicle continuously cruises.

The actual cut off position of the head lamp low beam may be applied with a value acquired by averaging cut off positions calculated repeatedly at the set number of times or more.

A cut off position of a control value output depending on the vehicle height may be calculated by applying an irradiation angle of the head lamp low beam and a height from the ground.

According to exemplary embodiments of the present disclosure, a head lamp low beam can be controlled to continuously irradiate a legally regulated position to ensure optimal night vision, thereby improving merchantability.

The optimal night vision can be ensured even under an abnormal situation due to mechanical failure and an error to thereby improve reliability.

Fail safety can be provided under a hazard situation by strengthening functional safety.

A cut off position of a head lamp low beam is corrected by using a pre-applied system without requiring a separate additional component to improve merchantability and reliability and ensure price competiveness.

DETAILED DESCRIPTION OF THE EMBODIMENTS

Figure 1:
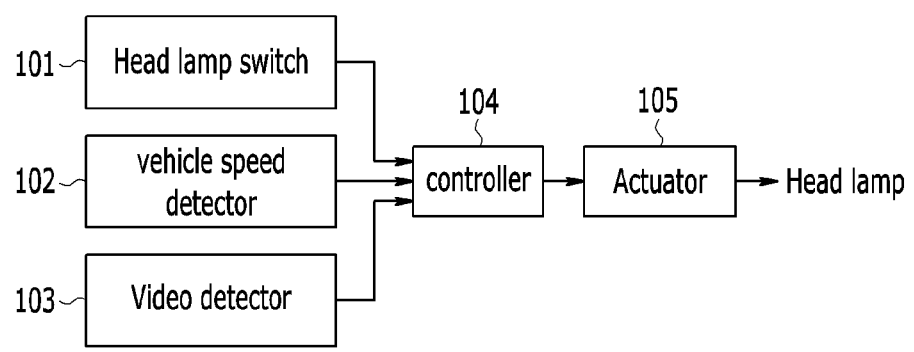
FIG. 1 is a diagram schematically illustrating a head lamp cut off position correction system for a vehicle according to an exemplary embodiment of the present disclosure.
Figure 2:
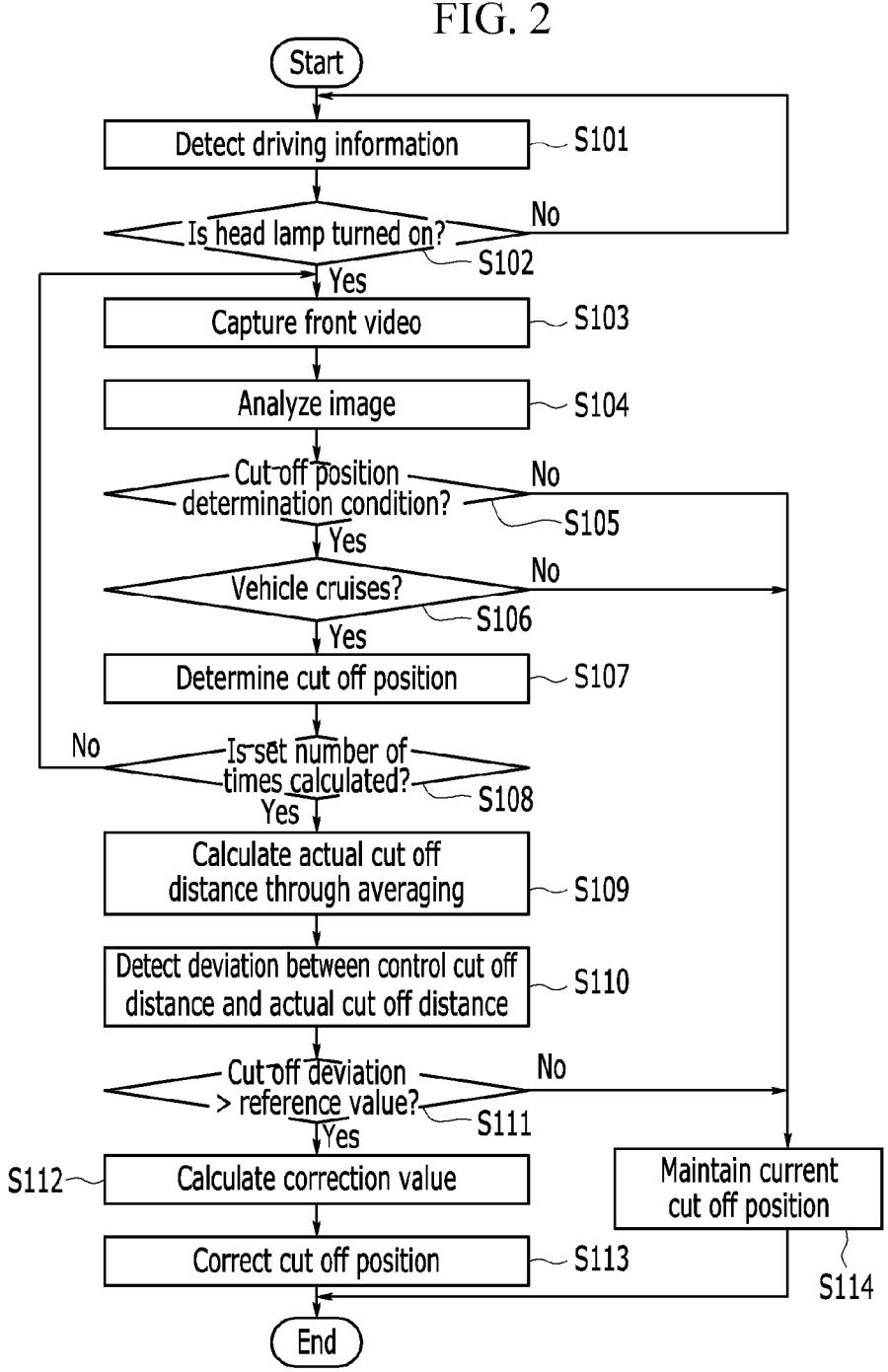
FIG. 2 is a flowchart illustrating a head lamp cut off position correction procedure according to an exemplary embodiment of the present disclosure.

Hereinafter, exemplary embodiments of the present disclosure will be described more fully hereinafter with reference to the accompanying drawings, in which exemplary embodiments of the disclosure are shown.

As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification. In addition, each configuration illustrated in the drawings is arbitrarily shown for understanding and ease of description, but the present disclosure is not limited thereto.

FIG. 1 is a diagram schematically illustrating a head lamp cut off position correction system for a vehicle according to an exemplary embodiment of the present disclosure. Referring to FIG. 1, the head lamp cut off position correction system according to the present disclosure includes a head lamp switch 101, a vehicle speed detector 102, a video detector 103, a controller 104, and an actuator 105.

The head lamp switch 101 is configured by a combination switch around a steering wheel or is installed at a predetermined location to output a signal for selecting turn-on or turn-off of a head lamp and provide the output signal to the controller 104.

The vehicle speed detector 102 detects a driving vehicle speed from an RPM of an output shaft of a transmission to provide information on the detected driving vehicle speed to the controller 104 as an electrical signal.

The video detector 103 detects a video of a front side while driving to provide information on the detected video to the controller 104.

The controller 104 captures a night video input in the video detector 103 in a driving state in which the head lamp is turned on, and thereafter, analyzes an image to determine a cut off position of a head lamp low beam. The control unit 104 synthetically determines surrounding illumination, the presence of a streetlamp, the presence of a preceding/oncoming vehicle, and an acceleration in order to determine the reliable cut off position of the head lamp low beam, and analyzes the cut off position of the head lamp low beam through a video image only when there are no surrounding light and no other surrounding vehicles.

The controller 104 uses a video analysis algorithm which is pre-applied for the surrounding illumination, the presence of the streetlamp, and the presence of the preceding/oncoming vehicle. The controller 104 divides a bright part and a dark part of each pixel by analyzing the video image under a cruising condition to extract the cut off position of the head lamp low beam.

Since the controller 104 is not an item in which error correction for the cut off position of the head lamp low beam needs to be performed in real time, an average cut off distance is calculated through a repeated task at the predetermined number of times, for example, 10 times or more in order to ensure reliable data.

The controller 104 compares a cut off control value of the head lamp low beam controlled by a height of the vehicle and an actual cut off position of the head lamp low beam extracted by analyzing the image of the night video input through the video detector 103.

The cut off control value of the head lamp low beam controlled by the height of the vehicle means a control value to set the cut off position to an initial position which is regulated. For example, in general, in the case of a passenger vehicle, the cut off position may be controlled to −1.0% position (−0.57 degrees).

The controller 104 detects a deviation of the cut off control value of the head lamp low beam, which is controlled by the height of the vehicle, and the cut off position of the head lamp low beam, which is extracted by analyzing the image of the night video, as follows.

Figure 3:
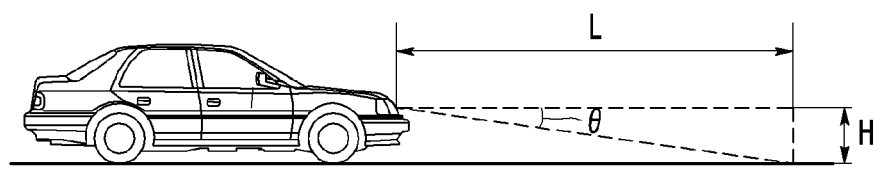
FIG. 3 is a diagram illustrating calculation of a head cut off position according to an exemplary embodiment of the present disclosure.
Figure 4:
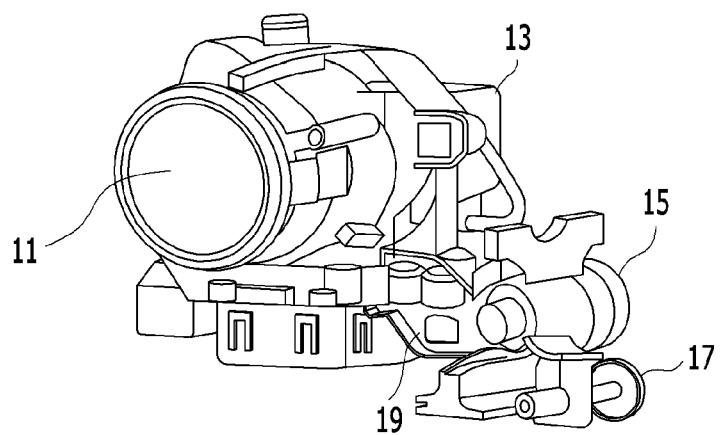
FIG. 4 is a diagram illustrating a head lamp aiming structure in the related art.

As shown in FIG. 3, the controller 104 converts the cut off control value of the head lamp low beam, which is controlled by the height of the vehicle, to a cut off position of a road surface.

In the conversion of the cut off position, a cut off position L may be converted as follows by applying an irradiation angle θ of the head lamp low beam and a height H from the ground.

$$L = H/0.57$$

When the cut off position L for the control value is converted, a position deviation X is extracted by subtracting the actual cut off position, which is extracted by analyzing the video image, from the converted cut off position L, and it is determined whether the deviation X is more than a reference distance (for example, 10 m) for correction. The position reference distance of the correction may be changed according to a vehicle characteristic.

The controller 104 corrects the deviation of the head lamp cut off position by actuating the actuator 105 after calculating an offset value for correcting an error distance when the deviation of the control value, and the actual cut off position is more than the correction reference distance.

For example, when it is assumed that the actual cut off position L of the head lamp low beam is 50 m and the cut off position of the head lamp low beam calculated by the control value is 60 m, the cut off positions are corrected to a cut off position (−1.0% position) of a reference control value by increasing a motor control amount by a distance of 10 m.

The actuator 105 may be configured by a motor, and the actuator 105 is operated according to a control signal applied from the controller 104 to move the head lamp upward or downward, thereby aligning a position of the head lamp low beam, which is actually irradiated, to the cut off position output by the control value.

An operation of the present disclosure including the aforementioned function will be described below.

In a vehicle to which the present disclosure is applied, the controller 104 detects driving information (S101) to determine whether the head lamp is turned on (S102).

When it is determined that the head lamp is turned on in step S102, the controller 104 captures a video of a road in front of a vehicle detected through the video detector 103 (S103), and thereafter, analyzes the video image by using the set video analysis algorithm (S104).

The controller 104 determines whether the cut off position of the head lamp low beam satisfies a determination condition in analyzing the video image in step S104 (S105).

The controller 104 synthetically determines the surrounding illumination, the presence of the streetlamp, and the presence of the preceding/oncoming vehicle by analyzing the video image in order to determine the reliable cut off position of the head lamp low beam, and analyzes the cut off position of the head lamp low beam through a video image according to the determination condition only when there is no surrounding light and no other surrounding vehicles. The controller 104 uses a video analysis algorithm which is pre-applied for the surrounding illumination, the presence of the streetlamp, and the presence of the preceding/oncoming vehicle.

The controller 104 detects the vehicle speed to determine whether the vehicle cruises when the cut off position of the head lamp low beam satisfies the determination condition in step S105 (S106).

The controller 104 maintains the cut off position of the head lamp low beam to a current position when the cut off position of the head lamp low beam does not satisfy the determination condition in step S105 or the vehicle does not cruise in step S106 (S114).

When it is determined that the vehicle cruises in step S106, the control unit 104 divides a bright part and a dark part of each pixel of the video image to determine the cut off position of the head lamp low beam (S107).

Since the controller 104 is not an item in which error correction for the cut off position of the head lamp low beam needs to be performed in real time, an average cut off distance is calculated (S109) through a repeated task at the predetermined number of times, for example, 10 times or more in order to ensure reliable data (S108).

When the actual cut off position of the head lamp low beam, which is averaged through the repeated task at the set number of times, is calculated, the controller 104 compares the calculated cut off position and the cut off control value of the head lamp low beam controlled by the height of the vehicle to detect the deviation of the cut off position (S110).

The cut off control value of the head lamp low beam controlled by the height of the vehicle means a control value to set the cut off position to an initial position which is legally regulated. For example, in general, in the case of a passenger vehicle, the cut off position may be controlled to −1.0% position (−0.57 degrees).

The controller 104 detects a deviation of the cut off control value of the head lamp low beam controlled by the height of the vehicle and the cut off position of the head lamp low beam extracted by analyzing the image of the night video as follows.

As can be seen in FIG. 3, the controller 104 converts the cut off control value of the head lamp low beam, which is controlled by the height of the vehicle, to a cut off position of a road surface.

In the conversion of the cut off position, a cut off position L may be converted as follows by applying an irradiation angle θ of the head lamp low beam and a height H from the ground.

$$L = H/0.57$$

When the cut off position L for the control value is converted, a position deviation X is extracted by subtracting the actual cut off position, which is extracted by analyzing the video image, from the converted cut off position L, and it is determined whether the deviation X is more than a reference distance (for example, 10 M) for correction. The position reference distance of the correction may be changed according to a vehicle characteristic.

The controller 104 determines whether the deviation of the cut off control value of the head lamp low beam controlled by the height of the vehicle and the actual cut off position is more than the correction reference distance (S111) and calculates the offset value for correcting the error distance when the deviation which is more than the correction reference distance (for example, 10 m) is detected (S112) and thereafter, corrects the deviation of the head lamp cut off position by actuating the actuator 105 configured by the motor (S113).

For example, when it is assumed that the actual cut off position L of the head lamp low beam is 50 m and the cut off position of the head lamp low beam calculated by the control value is 60 m, the cut off positions are corrected to a cut off position (−1.0% position) of a reference control value by increasing a motor control amount by a distance of 10 m. That is, the controller 104 moves the head lamp upward or downward by actuating the actuator 105 to align the position of the head lamp low beam, which is actually irradiated, to the cut off position output by the control value.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A head lamp cut off position correction system for a vehicle, comprising:
   a head lamp switch configured to output a turn-on/off signal of a head lamp;
   a vehicle speed detector configured to detect a driving vehicle speed;
   a video input configured to detect a video of a front of the vehicle while driving;

a controller configured to determine an actual cut off position of a head lamp low beam by analyzing a video image detected by the video input, compare the determined actual cut off position and a cut off control value of the head lamp low beam depending on a height of the vehicle, and correct the cut off position; and an actuator configured to align a beam position of the head lamp upward or downward by control of the controller.

2. The system of claim 1, wherein:

the controller synthetically determines surrounding illumination, the presence of a streetlamp, the presence of a preceding/oncoming vehicle, and an acceleration in order to determine a reliable cut off position of the head lamp low beam, and calculates the actual cut off position of the head lamp low beam from the video image only when there is no surrounding light and no other surrounding vehicles.

3. The system of claim 1, wherein:

the controller divides a bright part and a dark part of each pixel by analyzing the video image under a cruising condition to calculate the actual cut off position of the head lamp low beam.

4. The system of claim 1, wherein:

the controller calculates the actual cut off position of the head lamp low beam at the set number of times or more by analyzing the video image and thereafter, averages the calculated cut off position to apply the averaged cut off position to a cut off distance.

5. The system of claim 1, wherein:

the controller calculates a cut off position of a control value output depending on the vehicle height by applying an irradiation angle of the head lamp low beam and a height from the ground.

6. A head lamp cut off position correction method, comprising steps of:

analyzing a video image by capturing a video of a road in front of a vehicle while night driving with a head lamp being turned on;

determining whether a current driving condition satisfies a determination condition of a cut off position of a head lamp low beam;

determining an actual cut off position of the head lamp low beam by dividing a bright part and a dark part of a video image pixel when the cut off position of the head lamp low beam satisfies the determination condition;

extracting a deviation by comparing a cut off position control value of the head lamp low beam depending on a height of the vehicle and the actual cut off position of the head lamp low beam calculated by analyzing the video image; and aligning the cut off position through an actuator by calculating a cut off position correction value of the head lamp low beam in accordance with the extracted deviation.

7. The method of claim 6, wherein:

the determination condition of the cut off position of the head lamp low beam is determined as a case in which there is surrounding light and no other surrounding vehicle and a state in which the vehicle continuously cruises.

8. The method of claim 6, wherein:

the actual cut off position of the head lamp low beam is applied with a value acquired by averaging cut off positions calculated repeatedly at the set number of times or more.

9. The method of claim 6, wherein:

a cut off position of a control value output depending on the vehicle height is calculated by applying an irradiation angle of the head lamp low beam and a height from the ground.

10. A head lamp cut off position correction system for the vehicle comprising:

a vehicle speed detector configured to detect a driving vehicle speed;

a video input configured to detect the front video;

a controller configured to correct the cut off position of the head lamp low beam; and an actuator configured to align the cut off position of the head lamp low beam upward/downward by control of the controller, wherein the controller operates in accordance with a set program to determine the actual cut off position of the head lamp low beam by executing the method of claim 6, compares the determined cut off position and a cut off control value of the head lamp low beam depending on the height of the vehicle, and corrects the cut off position.

* * * * *